United States Patent [19]
Mitkov et al.

[11] Patent Number: 4,532,940
[45] Date of Patent: Aug. 6, 1985

[54] CORN SHELLER

[75] Inventors: Atanas L. Mitkov; Ivan N. Georgiev; Peter T. Radulov; Le K. Hung; Atanas K. Atanassov, all of Russe, Bulgaria

[73] Assignee: V T U "Angel Kanchev", Russe, Bulgaria

[21] Appl. No.: 459,687

[22] Filed: Jan. 20, 1983

[51] Int. Cl.³ .............................................. A01D 9/00
[52] U.S. Cl. ......................................... 130/6; 130/8; 130/30 H; 130/30 E
[58] Field of Search .................. 130/6, 8, 30 H, 30 T, 130/30 E, 27 K, 27 L, 27 S, 27 J

[56] References Cited
U.S. PATENT DOCUMENTS

| | | | |
|---|---|---|---|
| 790,289 | 5/1905 | Conner | 130/6 |
| 878,037 | 2/1908 | Berns et al. | 130/6 |
| 1,029,451 | 6/1912 | McKee | 130/6 |
| 3,844,293 | 10/1974 | Young et al. | 130/6 |
| 4,337,782 | 7/1982 | Da Silva | 130/6 |

FOREIGN PATENT DOCUMENTS 10304 of 1892 United Kingdom ..................... 130/6

Primary Examiner—Robert P. Swiatek
Assistant Examiner—David L. Tarnoff

[57] ABSTRACT

Corn shelling apparatus having a supporting frame and a receiving hopper mounted on its upper part, beneath the hopper there being at least one shelling unit made up of an inner drum and an outer counter-drum, the drum being fitted inside the counter-drum, and having a fan and chute for removing the impurities, the stripped corn cobs, and the kernels. The drum is cylindrical, the counter-drum is frusto-conical and has its larger diameter turned upwardly toward the receiving hopper; the axes of the drum and counter-drum are vertical, and the peripheral surfaces of the drum and counter-drum are made of rods. The rods of the drum are disposed parallel and skewed with respect to vertical axial sections of the drum, and the rods of the counter-drum are disposed along the generant of a cone. The apparatus has an inclined kernel-collecting plane member enveloping the counter-drum upon the supporting frame of the apparatus.

7 Claims, 3 Drawing Figures

CORN SHELLER

This invention relates to an apparatus for the shelling of corn; the apparatus can either be used separately or can be included in a production line for shelling, cleaning, and drying the corn. Such line may also include means for grading the shelled corn.

A known apparatus for shelling corn has a supporting frame, a corn receiving hopper, and at least one corn sheller having a drum and a counter-drum disposed horizontally one within the other. The drum is tapered and has longitudinally mounted blades which are of the screw type in their front and rear portions. The counter-drum is also tapered, and its larger diameter is connected to the receiving hopper. The circumferential surface of the counter-drum is made of a rod grating wherein the rods are spaced a constant distance from each other along their entire lengths. Such prior art sheller is disclosed in Bulgarian Authorship Certificate No. 27,962.

A shortcoming of the above well-known apparatus is the impact effect of the drum blades on the corn cobs, which results in considerable damage to the kernels of corn, so much so that they cannot do used as seeding material. The drum impact effect also entails the increased consumption of energy by reason of the breaking of the cobs. This breaking, in turn, makes the cleaning of the grain more difficult. The construction of the counter-drum with rods located at a constant distance from each other is technologically difficult.

An apparatus for the shelling of corn wherein both the drum and the counter-drum are tapered and disposed vertically under a receiving hopper is also known. The drum and the counter-drum are disposed with their smaller diameters turned toward the receiving hopper. The peripheral surface of the drum has blades fitted along the generant of the cone. The counter-drum is made of sheet steel provided with holes stamped therein. This construction is shown in French Pat. No. 1,400,181.

The disadvantage of the latter described prior art apparatus is the great fragmentation of the cobs, such action commencing from their initial feeding and being intensified toward the exit end of the sheller because of the increase of the drum diameter. This fragmentation of the cobs brings about an increased energy consumption, and also makes the cleaning of the grain more difficult. The counter-drum cannot sufficiently screen the shelled kernels due to the small section of the holes provided in it. Another disadvantage of this apparatus is that it can operate in a normal manner only when the corn cobs are comparably dry.

The present invention has among its objects the provision of a corn shelling apparatus which has greater productivity, a small power consumption, which occasions minimum damage to the corn kernels, and operates normally throughout a wide range of humidity or dampness of the corn cobs.

The above objects are achieved by an apparatus in accordance with the invention, wherein under a receiving hopper there are provided one or more pairs of drums and counter-drums fitted one within the other, the drums being mounted on a supporting frame, and screens connected to a fan and a shute for removing the impurities, the shelled cobs, and the grain kernels. The drum is cylindrical and the counter-drum is conical (tapered) and is turned so that its larger diameter or end is adjacent the receiving hopper. The axes of the drum and counter-drum are disposed vertically.

The periphery of the drum is formed by a plurality of round rods disposed parallel to each other and skewed with respect to the axis of the drum and at uniform distances from each other along their entire lengths. On two rods fitted opposite to each other there is affixed another guiding rod which is chamfered in its lower end part to prevent any jamming of stripped corn cobs between the drum and the counter-drum. An upper steel cone turned with its larger based diameter downwardly is fitted to the upper end of the drum for the better direction and vertical orientation of the corn cobs fed thereto.

The periphery of the counter-drum is also made of round rods, such rods being disposed parallel to the vertical axis of the counter-drum in radial axial planes thereof. The counter-drum is fitted to the supporting frame of the apparatus in such manner that it may be shifted vertically. This permits the adjustment of the clearance between the drum and the counter-drum at their lower ends when shelling cobs of different physical and mechanical properties. Externally the counter-drum is surrounded by an inclined collecting plane which collects the kernels passing through the grating of the counter-drum and feeding them to a lower screen of the apparatus where the kernels of grain are cleaned.

In a preferred embodiment of the apparatus of the invention, two pairs of drum/counter-drum units are employed, such units being mounted under the receiving hopper.

The advantages of the apparatus according to the invention consist in the fact that due to the lack of any impact effect upon the kernels of corn as a result of the oriented cob shelling, guaranteed by their free falling and the parameters and the interplay of the drum and counter-drum, a low degree of kernal damage results, a low degree of stripped cob breaking is produced, and a high productivity of the device is achieved, while permitting the shelling of cobs having a quite sizable range of physical and mechanical properties. The small extent of fragmentation of the stripped cobs also brings about a considerable reduction in the consumption of electric power, and improves the purity of the kernels. The layout of the rods of the counter-drum along a conical generant also facilitates its fabrication.

A preferred embodiment of the apparatus of the invention is illustrated in the attached drawings, wherein.

Figure 1:
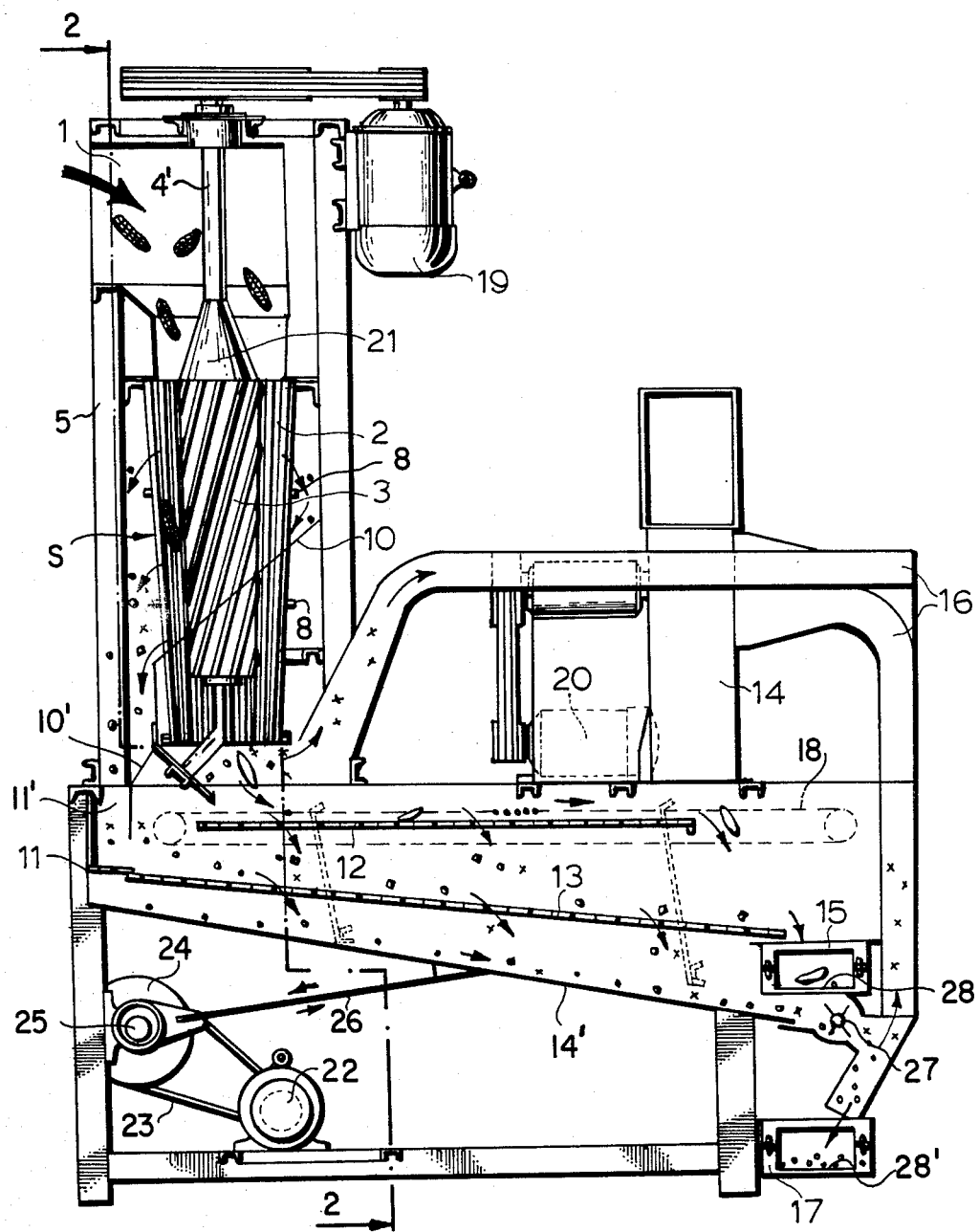
FIG. 1 is a schematic view in side elevation of the apparatus.
Figure 2:
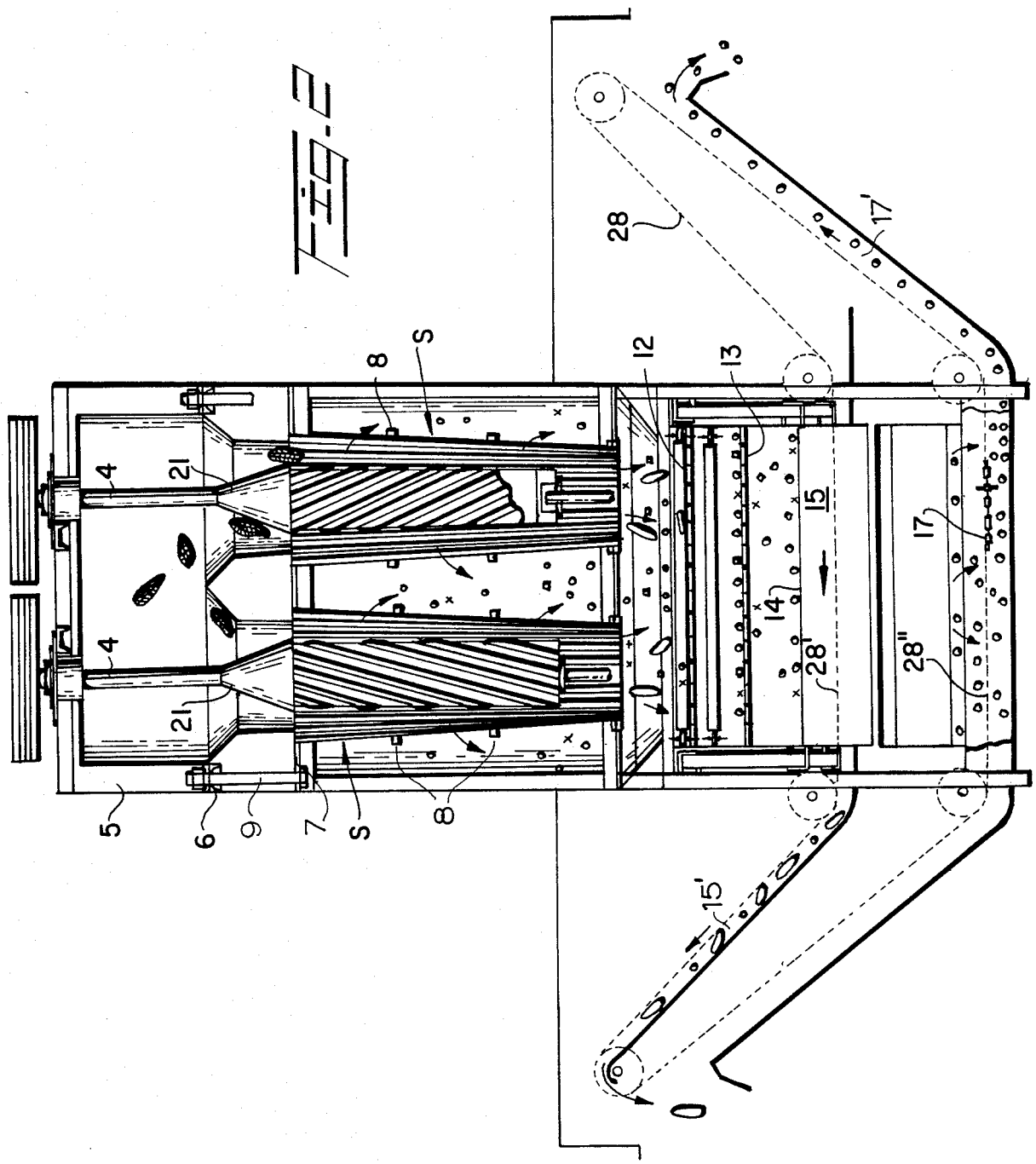
FIG. 2 is a view in cross-section through the apparatus, the section being taken along the broken line 2—2 in FIG. 1.
Figure 3:
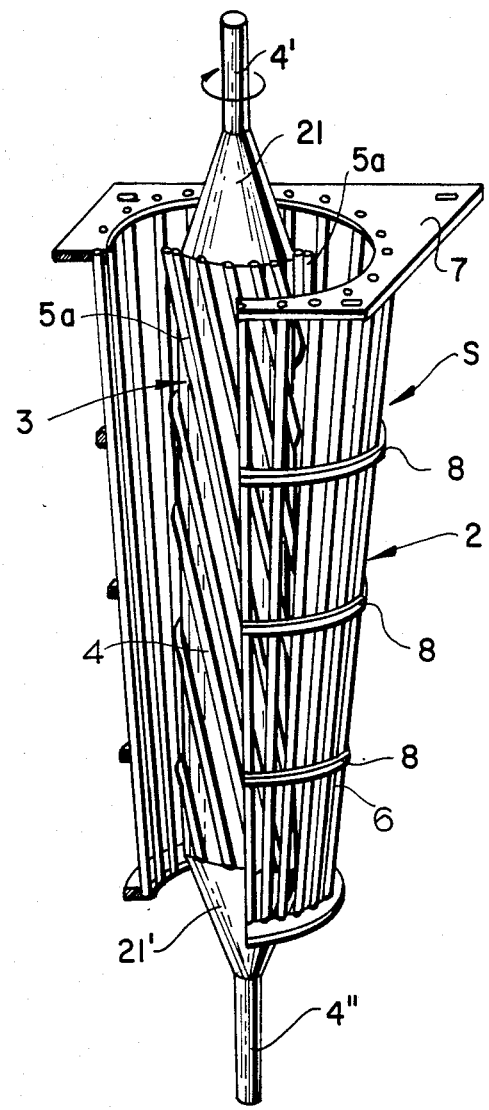
FIG. 3 is a fragmentary view of a drum/counter-drum unit.

Referring first to FIGS. 1 and 2, the apparatus is provided with a frame 5 upon the top of which there is mounted a receiving hopper 1. Disposed beneath the hopper 1 are two similar parallel vertically mounted drum/counter-drum units S. Each of such units S is made up of a downwardly converging frusto-conical outer counter-drum 2 and an inner cylindrical drum 3 disposed within the counter-drum, as shown. Each of the drum and counter-drum are made up of rods, the rods 6 making up the periphery of the counter-drum 2 being disposed in vertical axial planes of the counter-drum, whereas the rods 4 making up the periphery of the inner drum 3 are disposed skewed with respect to the axis of the drum 3, parallel to each other, and at equal distances from each other. A guiding rod 5a, which in its last one-third length at the bottom thereof is chamfered, that is, tapered to decrease in thickness in a radial axial direction with respect to the drum, to virtually zero at the bottom end of the drum, is fitted on two rods 4 mounted opposite each other (FIG. 3). Each drum 3 is closed at its upper end by an upwardly converging steel cone 21. At its lower end the drum 3 is provided with a similar but oppositely disposed steel cone 21'. The drum 3 is supported and guided at its top by a shaft 4 and at its bottom by a shaft 4'.

The drums 2 are made of a rod grating, the rods 6 forming such gratings being fitted on the cone generant. The upper ends of rods 6 are fixed to a common plate 7, and rings 8, spaced along the vertical height of the counter-drum are fixed to the rods so as to form an integral member thereof and to maintain the predetermined spacing between successive rods.

The distance between the confronting, active surfaces of drums 3 and the respective counter-drums 2 is adjusted by a vertical shifting of the counter-drums by means of adjusting means 9. Such adjusting means takes the form of a plurality of machine screws which extend between the plate 7 and thus the counter-drums 3 and a fixed support 6 on the frame 5 of the apparatus. Nuts on the vertical screws permit the counter-drums 3 to be raised and lowered as required.

An inclined collecting plate 10, mounted upon the frame 5 of the apparatus, is disposed about the lower part of each of the counter-drums 2 to remove the kernels of grain which have passed through the wall of the counter-drum through the spaces between adjacent rods 6 thereof.

The apparatus provides for the automatic separation of the kernels from the stripped cobs, and for the cleaning of the kernels. Disposed beneath the lower ends of the drum/counter-drum units S is a first, horizontal conveyor belt 18 in the form of a screen which is driven so that the upper run thereof, which is supported upon a fixed screen 12, travels from left to right in FIG. 1. As indicated in FIGS. 1 and 2, the belt screen 18 receives the stripped cobs and transports them to the right to be discharged and to fall upon the upper run of a belt 28 which is driven to travel in a chute 15 in the direction from right to left in FIG. 2. Belt 28 carries the stripped cobs upwardly through an inclined chute 15' from the upper end of which they are discharged, as shown.

The kernels of corn after passing through the wall of the counter-drum and travelling downwardly along the plate 10 are conducted by a sheet metal guide 10' connected to the lower edge of plate 10 to be discharged upon the lefthand end of a screen plate 13 disposed beneath the upper fixed screen 12 and the conveyor belt screen 18. The lower screen 13, which is inclined downwardly from left to right, forms a part of an agitated or vibrated trough structure having a lower, kernal supporting trough 14' attached thereto. The kernels travel downwardly along the screen 13 falling through the holes therein into the trough 14'. Larger impurities, such as parts of stripped cobs, which pass down along the screen 13 and fall off the lower end thereof, are deposited upon the upper run 28' of the previously described belt 28 in the chute 15 from which they travel upwardly to be discharged from the inclined chute portion 15'.

The kernels travel down the trough 14 to encounter a driven paddle wheel 27 which discharges them to a short inclined conduit from which they are discharged to the lower horizontal run 28" of the feeding belt 28 which travels in a direction from left to right in a lower chute 17. Such lower run of belt 28 carries the kernels upwardly inclined chute 17', the grain being discharged from the upper end of such chute 17', as shown.

A fan 14, driven by an electric motor 20, has its intake connected to a first portion of a conduit which extends to a space beneath lower end of each of the drum/counter-drum units S and to a space containing the paddle wheel 27 and the lower end of the vibrating feeding unit made up of the screen 13 and the trough 14'. The fan thus subjects the corn kernels at both such locations to reduced pressure and thus rids them of unwanted smaller impurities.

The unit composed of the screen 13 and the trough 14 is vibrated or agitated by mechanism schematically shown at the lower left-hand corner of FIG. 1. Such mechanism includes an electric motor 22 which through a belt 23 and a pulley 24 drives an eccentric 25. The eccentric is connected by a link 26 to the trough 14', to which the screen 13 is connected.

The left-hand, upper end of the screen 13 is provided with a transfer or switching member 11 in the form of an L-shaped member having vertical and horizontal legs. Part 11 may be moved from the position of FIG. 1, wherein permits the discharge of material to the screen 13 from both inside and outside the drum/counter-drum units S to a dash-line position 11' to the right of that shown in FIG. 1 wherein the horizontal part of member 11, in effect, opens the upper left-had end of the screen 13, whereby to permit the direct passage of kernels which have passed through the wall of the counter-drums Z to the trough 14 without requiring them to travel along the screen 13.

The above-described apparatus operates in the following manner:

The corn cobs are fed by a conveyor (not shown) to receiving hopper 1. Under their own weight and the effect of drums 3, the cobs are directed and moved downwardly in the gradually narrowing space between drum 3 and counter-drums 2. Shelling of the kernels is effected as a result of their rubbing by and between drums 3 and counter-drums 2. The major part of the shelled kernels passes throught the gratings of counter-drums 2 and via the inclined plane 10 and member 11 in its solid line position are fed to the screens 12 and 13. The stripped cobs together with the remaining kernel parts fall directly on the first screen 12. There, by means of screens 12 and 13 and the effect of the air stream produced by fan 14 the large size and light-weight impurities are removed in chute 15 and the aspiration circuit 16. If this device is not connected to an aspiration system, the aspiration conduit 16 closes, and the light-weight impurities are removed together with the large sized ones through conduit 15.

When well-cleaned corn cobs are shelled, the grain passing through the gratings of counter-drums can be set directly by means of inclined planes 10 to the kernel chute 17 without necessarily going across the screens. This facilitates the operation of the apparatus, and its productivity accordingly increases.

Although the invention is illustrated and described with reference to a plurality of preferred embodiments thereof, it is to be expressly understood that it is in no way limited to the disclosure of such embodiments, but is capable of numerous modifications within the scope of the appended claims.

We claim:

1. A corn shelling apparatus having a supporting frame and a receiving hopper mounted on its upper part, beneath the hopper there being at least one shelling unit made up of an inner drum and an outer counter-drum, the drum being fitted inside the counter-drum, and means connected by a fan and chute for removing the impurities, the stripped corn cobs, and the kernels, the improvement wherein the drum is cylindrical, the counter-drum is frusto-conical and has its larger diameter turned upwardly toward the receiving hopper, the axes of the drum and counter-drum are vertical, and the peripheral surfaces of the drum and counter-drum are made of rods, the rods of the drum being disposed parallel and skewed with respect to vertical axial sections of the drum, and the rods of the counter-drum are disposed along the generant of a cone, and comprising an inclined kernel-collecting plane member enveloping the counter-drum and mounted upon the supporting frame of the apparatus.

2. Apparatus according to claim 1, wherein all of the rods of the drum and the counter-drum have round cross-sections.

3. Apparatus according to claim 1, comprising means mounting the counter-drum upon the supporting frame for vertical adjustment relative to the drum.

4. Apparatus according to claim 1, where in the clearance between the outer peripheral working surface of the drum and the inner peripheral working surface of the counter-drum in their lower parts ranges from 20–35 mm.

5. Apparatus according to claim 1, comprising a conveyor having an entering end and a discharge end, the entering end of the conveyor being disposed beneath the shelling unit, and kernel guiding means disposed beneath the lower end of the inclined collecting member and a position above the entering end of the conveyor.

6. Apparatus according to claim 3 wherein the clearance between the outer peripheral working surface of the drum and the inner peripheral working surface of the counter-drum in their lower parts ranges from 20–35 mm.

7. A corn shelling apparatus having a supporting frame and a receiving hopper mounted on its upper part, beneath the hopper there being at least one shelling unit made up of an inner drum and an outer counter-drum, the drum being fitted inside the counter-drum, and means connected by a fan and chute for removing the impurities, the stripped corn cobs, and the kernels, the improvement wherein the drum is cylindrical, the counter-drum is frusto-conical and has its larger diameter turned upwardly toward the receiving hopper, the axes of the drum and counter-drum are vertical, and the peripheral surfaces of the drum and counter-drum are made of rods, the rods of the drum being disposed parallel and skewed with respect to vertical axial sections of the drum, and the rods of the counter-drum are disposed along the generant of a cone, comprising an inclined kernel-collecting plane member enveloping the counter-drum and mounted upon the supporting frame of the apparatus, and a guiding rod mounted radially inwardly atop each of two opposite rods on the drum, the guiding rods being chamfered in their lower end parts.

* * * * *